United States Patent [19]

Davis et al.

[11] 4,370,540
[45] Jan. 25, 1983

[54] REFLECTIVE BEAM ROTATOR

[75] Inventors: Jack W. Davis, East Hartford; Paul R. Blaszuk, Lebanon, both of Conn.

[73] Assignee: United Technologies Corporation, Hartford, Conn.

[21] Appl. No.: 209,940

[22] Filed: Nov. 24, 1980

Related U.S. Application Data

[63] Continuation of Ser. No. 1,038, Jan. 4, 1979.

[51] Int. Cl.$^3$ .............................................. B23K 27/00
[52] U.S. Cl. ......................... 219/121 LM; 219/121 L
[58] Field of Search ..... 219/121 L, 121 LM, 121 LU, 219/121 LW, 121 LA, 121 LP, 121 LQ, 121 EB, 121 EM, 121 EU, 121 EV; 350/6.5, 285; 148/158

[56] References Cited

U.S. PATENT DOCUMENTS

| | | | |
|---|---|---|---|
| 2,406,798 | 9/1946 | Burroughs | 350/6.6 X |
| 2,873,381 | 2/1959 | Lauroesch | 250/236 |
| 3,492,063 | 1/1970 | Lee | 350/160 |
| 3,520,595 | 7/1970 | Treuthart | 350/285 |
| 3,953,706 | 4/1976 | Harris et al. | 219/121 L |
| 3,986,767 | 10/1976 | Rexer et al. | 219/121 L |
| 4,058,699 | 11/1977 | Van Vloten | 219/121 L |
| 4,059,876 | 11/1977 | Ditto | 219/121 L |
| 4,160,894 | 7/1979 | Stemmler et al. | 219/121 L |

OTHER PUBLICATIONS

J. P. Wiley, *IBM Technical Disclosure Bulletin,* "Constant Path Length Optical Scanner," vol. 15, No. 4, Sep. 1972, p. 1291.

*Primary Examiner*—C. L. Albritton
*Attorney, Agent, or Firm*—Lawrence A. Cavanaugh

[57] ABSTRACT

An apparatus adapted for rotating a beam of radiation to obtain azimuthal and radial time averaging of the intensity distribution incident onto a workpiece is disclosed. The apparatus includes a housing adapted for rotation about a centerline axis, an entrance port and an exit port adapted for transmitting a beam of radiation through the housing, an inverter disposed within an internal passage within the housing and fixedly attached to the housing for rotation therewith includes a first mirror having a reflective surface angularly disposed to the rotation axis adapted for reflecting radiation incident thereon to a second mirror, a second mirror having a reflective surface adapted for reflecting radiation incident thereon to a third mirror having a reflective surface angularly disposed to the rotation axis adapted for passing radiation incident thereon through the exit port. Radiation passing through the housing is rotated about its propagation axis at an angular frequency twice the angular rotation rate of the housing. In one embodiment the third mirror has its centroid displaced from the centerline axis such that each ray in the rotating beam traces out an epicycloid instead of a circle thus averaging out some of the radial variations in the intensity distribution. The effect of spikes, hot spots, or the like in the intensity distribution are effectively time averaged over an interaction area on a workpiece when the rotation frequency is greater than the characteristic response time of the material of the workpiece.

3 Claims, 7 Drawing Figures

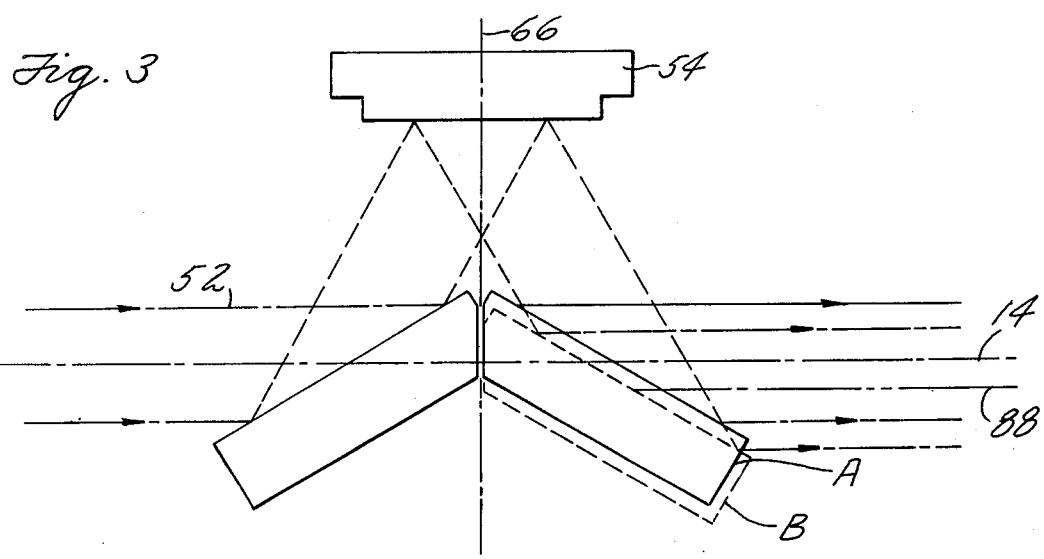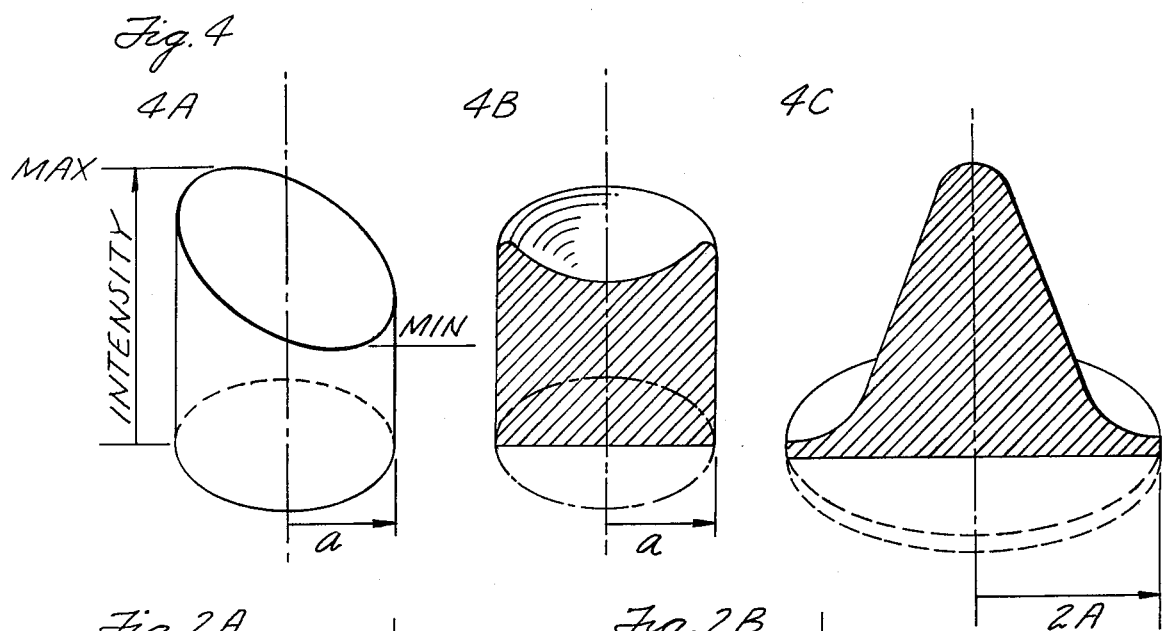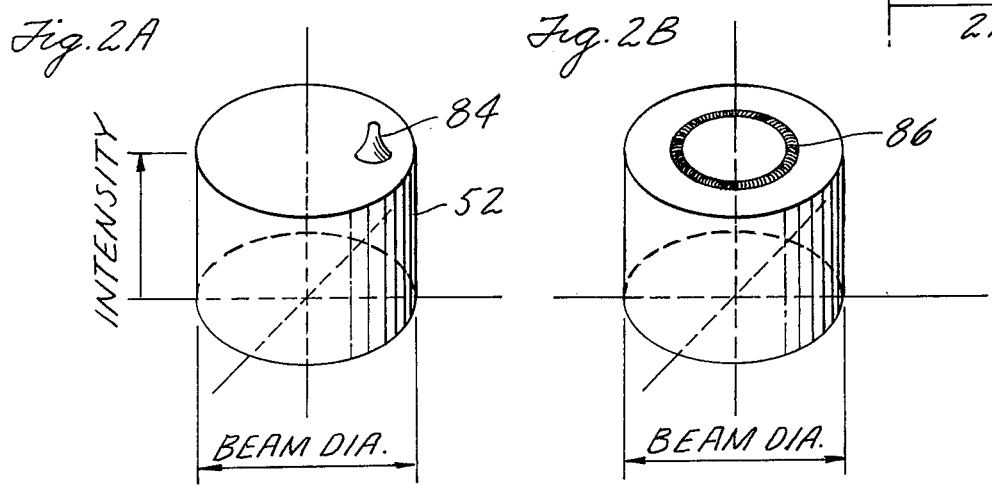

REFLECTIVE BEAM ROTATOR

This is a continuation of application Ser. No. 1,038, filed on Jan. 4, 1979.

BACKGROUND OF THE INVENTION

The present invention relates to material processing and more particularly to an apparatus adapted for time averaging the intensity distribution of a beam of radiation.

Material processing applications typically require a rapid control scanning of a beam of high power radiation over the surface of a workpiece. Many heat treating applications utilizing laser radiation, such as transformation hardening of metal surfaces, require relatively precise control of the beam intensity incident onto the workpiece. Too intense a beam of radiation will produce melting of the surface material while too weak a beam produces insufficient depth of the transformation hardened surface to be of use. A beam of radiation having high power typically has an intensity cross-sectional distribution which varies considerably in the radial and azimuthal directions. Although the average intensity distribution may be adequate for the intended application, such as surface hardening, welding, etc., radiation hot spots and cold spots within the beam resulting from variations in the intensity distribution interact with the workpiece producing inhomogeneities in the interaction zone therein.

One method of time averaging the intensity distribution of a high power beam of radiation incident onto a workpiece is to oscillate the beam across the workpiece-radiation interaction zone. This method has been clearly demonstrated in electron beam technology wherein electron beams due to their electric charge can be readily scanned over an interaction zone with electric or magnetic means. Electro-optical and mechanical scanning means are available for low frequency oscillation of a beam of laser radiation typically having low power. However, low frequency oscillation of the beam to obtain time averaging of the intensity distribution does not improve material processing since the reaction time of the material is typically more rapid than the time required to scan the beam across the interaction zone and the beam material interaction retains the characteristics of that produced by a non-oscillating beam.

Stetson et al. in U.S. patent application Ser. No. 001,101 filed on even date herewith and held with the present application by a common assignee, discloses a mechanical scanning apparatus adapted for oscillating the focused zone of a beam of radiation having high power over an interaction zone on a workpiece to time average the intensity distribution of the radiation on the workpiece. The apparatus includes a compound beam adapted for being vibrated in a vibratory mode resulting in oscillatory motion of at least one end of the compound beam. A reflective surface fixedly attached to the end of the compound beam is adapted for focusing a beam of radiation incident thereon to a focused zone. Vibrating the compound beam in a fundamental vibration mode results in the end of the beam moving at the same frequency producing an oscillation of the focused zone. The rapid controlled scanning of the radiation across the interaction zone on the workpiece reduces the average intensity of the beam energy input onto the workpiece while maintaining a high instantaneous intensity on the interaction zone to promote effective coupling of the radiation with the workpiece. The apparatus is adapted for producing line scans and curvilinear scans of the focus zone to obtain radial and azimuthal time averaging of the intensity distribution of the radiation incident onto the workpiece. The present invention discloses a means of time averaging the intensity distribution of a beam of radiation incident onto a workpiece by rotating the beam about its optical axis or an axis substantially parallel thereto.

SUMMARY OF THE INVENTION

A primary object of the present invention is to time average the intensity distribution of a beam of radiation incident onto a workpiece.

In accordance with the present invention, a beam of radiation is rotated about a propagation axis for time averaging the intensity distribution incident onto a workpiece. In further accord with the invention, means for inverting a beam of radiation is rotated about an axis, said means being adjustable to provide radial as well as azimuthal time averaging of the intensity distribution of radiation exiting the inverter.

A primary feature of the present invention is a beam inverter disposed within the interior passage of the housing adapted for inverting the radial coordinates of a beam of radiation passing therethrough. The beam inverter is fixedly attached to the housing such that as the housing rotates, the beam inverter rotates resulting in a rotation of the radial coordinates of radiation passing therethrough at twice the angular frequency of the rotation of the housing.

In an exemplary, the beam inverter includes a first mirror having a reflective surface angularly disposed to the path of the beam adapted for reflecting the beam to a second mirror, having a reflective surface with a substantially parallel relationship with and offset to the centerline axis, adapted for directing the beam incident thereon to a third mirror. The third mirror has a reflective surface angularly disposed to the path of the beam adapted for reflecting the beam incident thereon through the exit port. The reflective surfaces of the first and third mirrors are angularly disposed to one another such that a plane perpendicularly disposed to the centerline axis and passing through the second mirror, bisects the angle formed therebetween. A plurality of alignment screws attached to the back surface of each of the mirrors are adapted for adjusting the angular displacement of each of the mirrors with respect to the centerline axis and for adjusting the separation between the centerline axis and a centroid of each mirror. Additionally resilient means attached between the back surface of each mirror and the first housing are adapted for maintaining the mirrors in alignment. The apparatus is dynamically balanced about the centerline axis and is dynamically balanced with respect to the plane perpendicularly disposed to the centerline axis. Additionally drive means such as pulleys, gear trains or the like attached to the housing are adapted for attachment to motor means for rotating the housing about the centerline axis. Bearing means disposed about the exterior surface of the housing are adapted for maintaining the housing in axial alignment with the centerline axis. In one embodiment the third mirror is displaced from the centerline axis. The displaced third mirror is adapted for providing a beam passing out of the exit port having a propagation axis displaced from the centerline axis. Dynamic mass symmetry of the apparatus about the rotation axis is maintained by counterweights.

A primary advantage of the present invention is the time averaging of the intensity distribution of the radiation on a workpiece. Also the apparatus is adapted for operation with a beam of radiation having any arbitrary shape. Additionally the beam rotates at twice the angular frequency the housing rotates thereby reducing the required rotation speed of the housing to achieve a desired beam rotational speed. Also, with the third mirror displaced from the centerline axis, both azimuthal and radial time averaging of the intensity distribution in the beam is possible. Additionally the apparatus is bilateral in that radiation may be passed therethrough from both the entrance and exit ports.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWINGS

FIG. 2A is a simplified schematic representation of a beam of radiation having a cross-sectional intensity distribution with an intensity spike disposed at a radial position;

FIG. 2B is a simplified schematic representation of the time average intensity distribution of the distribution as shown in FIG. 2A on a workpiece;

FIG. 3 is a simplified schematic representation of an embodiment of the present invention;

FIG. 4A is a simplified representation of an intensity distribution of a beam of radiation;

FIG. 4B is a simplified representation of the intensity distribution as shown in FIG. 4A time averaged in accordance with the preferred embodiment; and FIG. 4C is a simplified representation of the time averaged intensity distribution on a workpiece of the distribution as shown in FIG. 4A in accordance with the embodiment of the present invention.

DESCRIPTION OF THE PREFERRED EMBODIMENT

Figure 1:
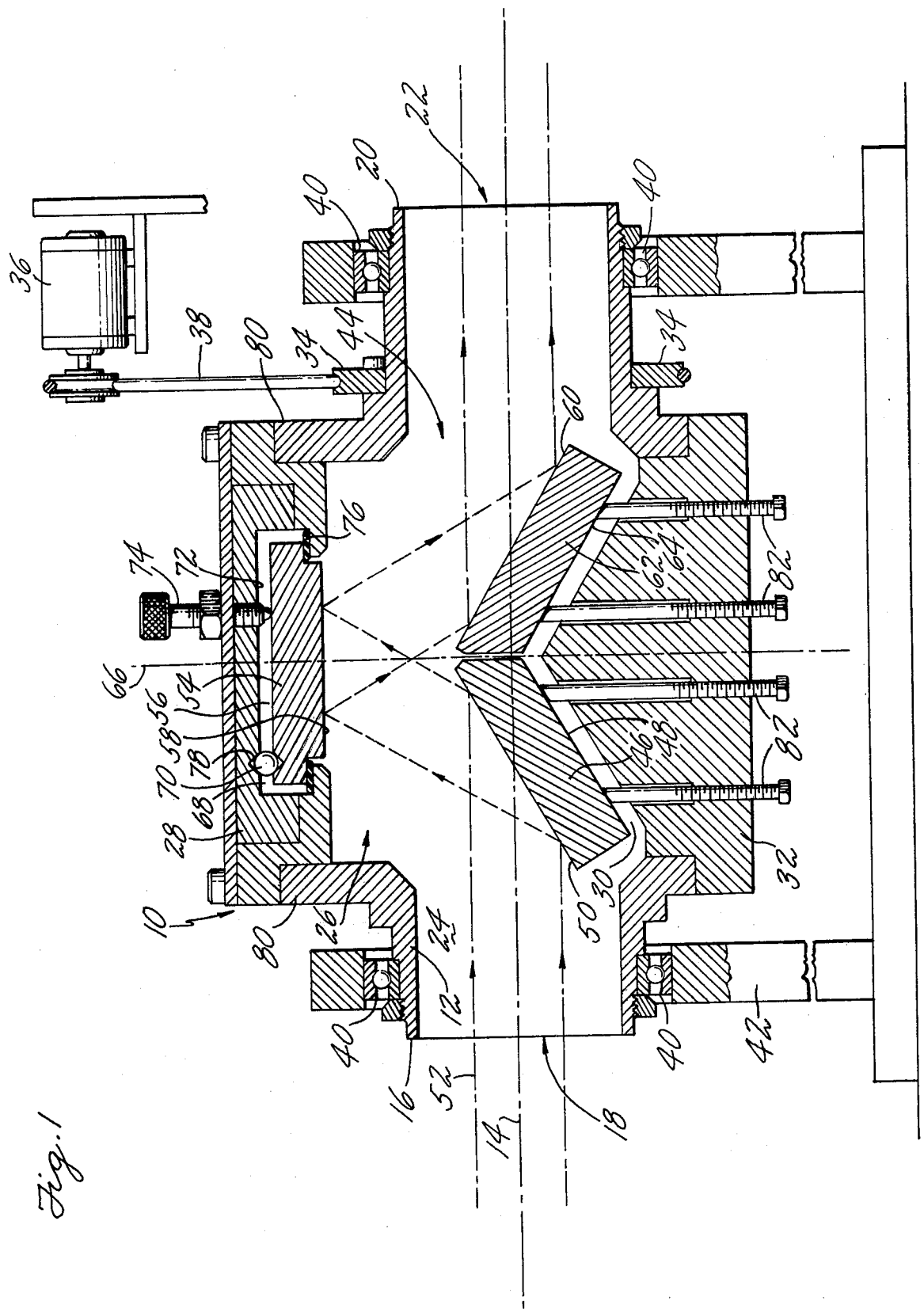
FIG. 1 is a simplified cross-sectional view of an apparatus adapted for time averaging the cross-sectional intensity distribution of a beam of radiation incident onto a workpiece in accordance with the present invention.

Referring now to FIG. 1 which shows a simplified cross-sectional view of an apparatus adapted for time averaging the cross-sectional intensity distribution of a beam of radiation incident on a workpiece in accordance with the present invention. The apparatus includes a housing 10 having a sidewall 12 with a cylindrical configuration longitudinally disposed about a centerline axis 14, a first end 16 having an entrance port 18 centrally disposed therein, a second end 20 having an exit port 22 centrally disposed therein, an interior passage 24 disposed between the first end and the second end wherein the entrance port, the interior passage and the exit port are symmetrically disposed about the centerline axis and are adapted for passing a beam of radiation therethrough.

The housing further includes a first adjustment channel 26, centrally located on the sidewall and perpendicularly disposed to the centerline axis, adapted for providing radial access to the internal passage 24 and for accommodating a first mirror holder 28 and a second adjustment channel 30 centrally located on the sidewall diametrically opposed the first adjustment channel and perpendicularly disposed to the centerline axis, adapted for providing radial access to the interior passage and for accommodating a second mirror holder 32. The housing is adapted for rotation about the centerline axis by a pulley 34 fixedly attached to the sidewall and connected to motor means 36 by a drive belt 38. Bearings 40 disposed about the sidewall proximate the first and second ends are adapted for maintaining the alignment of the housing about the centerline axis during rotation and for rotatably supporting the housing within a support structure 42.

A beam inverter 44 centrally disposed within the interior passage 24 and in alignment with the first and second adjustment channels 26, 30 respectively, includes a first mirror 46, having a back surface 48 and a reflective surface 50 angularly disposed to the centerline axis, adapted for intercepting a beam of radiation 52 passing through the entrance port into the interior passage and reflecting said radiation to a second mirror 54, adjustably attached to the first mirror holder 28, having a back surface 56 and a reflective surface 58 disposed in a spaced apart, substantially parallel, relationship with the centerline axis 14 wherein the reflective surface is adapted for directing the radiation incident thereon from the reflective surface of the first mirror to a reflective surface 60 of a third mirror 62 angularly disposed to the centerline axis 14 for directing the radiation through the exit port 22 and having a back surface 64 disposed in an angular relationship with the back surface 48 of the first mirror 46 such that a plane 66 orthogonally disposed to the centerline axis and passing through the second mirror bisects the angle between the reflective surfaces of the first and third mirrors. The reflective surface of the first, second and third mirrors are aligned such that the propagation axis of the radiation 52 incident onto the reflective surface of the first mirror is superimposed on the propagation axis of radiation reflected through the exit port 22 by the reflective surface of the third mirror and coincident with the centerline axis 14. The reflective surfaces of the beam inverter are adapted for inverting the coordinate positions of radiation passing through the housing about an axis orthogonally disposed to the rotation axis and to an axis within the plane 66 perpendicularly disposed to the reflective surface of the second mirror and for providing a reflective surface attached to the housing and adapted for rotation therewith, thereby providing rotation of a beam of radiation incident thereon proportional to the rotation rate of the housing. In the preferred embodiment the apparatus is adapted for rotating the beam at twice the rotation rate of the housing.

The second mirror 54, positioned within a cavity 68 in the first mirror holder 28, is adapted for small angular rotation about a pivot ball 70 disposed within the cavity between the back surface 56 of the mirror and a cavity wall 72 for providing small adjustments to control the propagation direction of the beam of radiation passing through the exit port. An adjustment screw 74 passing through the first mirror holder and positioned against the back surface of the second mirror is adapted for forcing the second mirror against a resilient ring 76 such as an "O" ring or wave washer disposed around the edge of the reflective surface of the second mirror between the second mirror and the first mirror holder for rotating the second mirror about the pivot ball to provide angular displacement of the reflective surface for adjusting the propagation direction of the beam. When the force applied by the adjustment screw is decreased, the resilient ring forces the second mirror against the screw to maintain the second mirror securely positioned within the holder. In the preferred embodiment the pivot ball is positioned within slots 78 in the back surface of the second mirror and the cavity wall to inhibit movement of the ball. The first mirror holder is adapted for being inserted into the first adjustment channel and fixedly attached to channel walls 80 defining the first adjustment channel by screws (not shown) or the like.

The first and third mirrors 46, 62 respectively, are positioned on the second mirror holder 32 within the second adjustment channel 30 by alignment screws 82 adapted for securing the first and third mirrors to the second mirror holder and for making fine adjustments to the angular displacement of the first and third mirrors with respect to the centerline axis for controlling the propagation direction of the radiation passing through the housing and for adjusting the relative elevation of the centroid of each mirror with respect to the centerline axis. In the preferred embodiment the alignment screws 82 are preferably a triplet group of screws, attached to each mirror, wherein each screw in the triplet group is adapted for providing independent rotation of each mirror about orthogonal axes by means well known in the art.

In operation a beam of radiation 52 preferably having a propagation axis superimposed on the centerline axis 14 of the housing passes into the housing through the entrance port 16 and is incident onto the reflective surface 50 of the first mirror 46 which directs the radiation to the second mirror 54 wherein the radiation is reflected to the reflective surface 60 of the third mirror 62 which directs the radiation through the exit port 22 with a propagation axis superimposed on the centerline axis as noted hereinbefore. The reflective surfaces of the mirrors within the beam inverter 44 are adapted for inverting the coordinate position of the radiation passing through the housing such that as the beam inverter rotates about the centerline axis at a rotation frequency of W, the beam passing through the exit port rotates at a rotation frequency of 2W. It is to be recognized that the present invention is adapted for rotating a beam having any cross-sectional configuration provided that the first, second and third mirrors intercept and reflect the entire cross-sectional area of the beam. It is also to be recognized that a beam passing through the entrance port 14 may be propagating as a parallel beam, a diverging beam, or a converging beam and is typically limited only to having a diameter less than the diameter of the reflective surfaces of the mirrors within the beam inverter and to having a power density below the threshold for inducing damage on the reflective surfaces.

In the preferred embodiment the radiation is rotated about its propagation axis with the rotation having circular symmetry. The rotational symmetry results in an azimuthal time averaging of the intensity distribution of the radiation incident onto a workpiece. FIG. 2A shows a simplified schematic representation of a beam of radiation 52 having a cross-sectional intensity distribution with an intensity spike 84 disposed at a radial position in the distribution. When this distribution is rotated in accordance with the present invention the time averaged intensity distribution on a workpiece will be as represented in FIG. 2B. A ring 86 approximating the time average of the intensity spike 84 on the workpiece in the azimuthal direction is shown having radial symmetry about the rotation axis and a time averaged intensity in the azimuthal direction.

Radial and azimuthal time averaging of the intensity distribution of the beam is accomplished by displacing the third mirror from a first position A to a second position B as shown in FIG. 3 wherein the radiation passing through the exit port has a propagation axis 88 displaced from the centerline axis 14. It is to be recognized that the alignment screws 82 as shown in FIG. 1, are adapted for displacing the centroid of the third mirror in a radial direction from the centerline axis and for providing the angular alignment of the reflective surface as hereinbefore noted. In operation as the housing is rotated, the radiation passing through the exit port traces out an epicycloid as it rotates about the centerline axis rather than the circle obtained from the operation of the preferred embodiment. Thus time averaging of some of the radial variations of the intensity distribution incident on a workpiece is accomplished. It is to be recognized that the rotation rate of the beam on a workpiece must be rapid to provide time averaging of the intensity distribution in a time shorter than the characteristic time of the material of the workpiece such that the workpiece effectively interacts with the time averaged beam. A slow rotation rate will result in a radiation-workpiece interaction similar to the interaction with no time averaging.

FIGS. 4A, B and C are schematic representations of the averaging effect of the present invention on a beam of radiation having an intensity distribution with a maximum on one side and a minimum on a diametrically opposed side as shown in FIG. 4A. When operated in accordance with the preferred embodiment the radiation as shown in FIG. 4A is azimuthally averaged on a workpiece resulting in the time averaged distribution on the workpiece as shown in FIG. 4B, wherein the distribution at the center remains relatively constant with the intensity distributin at the edge of the beam essentially azimuthally time averaged between the maximum and minimum values. Operating the present invention with the third mirror having its centroid displaced from the centerline axis results in the distribution as shown in FIG. 4C wherein the intensity at the center remains essentially equal to the maximum value as shown in FIG. 4A while the intensity at the outer radius of the interaction zone has a value approximating a time average intensity of the minimum value shown in FIG. 4A and an interaction zone having essentially twice the diameter as shown in FIG. 4B. The larger diameter results from the wobble induced on the beam by the off-axis rotation of the third mirror. The distribution as shown in FIG. 4C is time averaged in the azimuthal direction and in the radial direction.

Referring now to FIGS. 1 and 3, it is to be recognized that the apparatus as shown in FIG. 1 must be dynamically balanced about the centerline axis 14 and about the plane 66 for high speed rotation. For the embodiment as shown in FIG. 3, displacement of the centroid of the third mirror from position A to position B results in a dynamic imbalance to the system. Counterweights typically attached to the second mirror holder behind the first mirror are utilized to dynamically balance the apparatus about the plane 66 and are attached to the first mirror holder 28 typically about the position of the plane 66 for dynamically balancing the apparatus about the centerline axis. It is to be recognized that dynamic balancing by means well known in the art may be required for high speed rotation of the apparatus when utilized in any embodiment.

Although the present invention is shown utilizing a pulley drive means, it is to be recognized that the housing 10 may be rotated by any of the means well known in the art for rotating the housing at high rotation rates.

Although this invention has been shown and described with respect to preferred embodiments thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. An improved method of altering a workpiece comprising the steps of:
   (a) generating a beam of radiation having a first propagation direction, a predetermined beam area in a plane perpendicular to said propagation direction and a predetermined amount of power distributed in first intensity distribution in said predetermined beam area;
   (b) directing substantially all of said predetermined amount of power in said beam onto said workpiece along a radiation path having a radiation axis, said amount of power being distributed in a plane perpendicular to said radiation axis with a second intensity distribution dependent on said first intensity distribution, whereby said radiation alters a parameter of said workpiece by a variable amount having a parameter variation distribution dependent on said second intensity distribution, wherein the improvement comprises:
   (c) directing substantially all of said predetermined amount of power in said beam simultaneously onto said workpiece and simultaneously rotating said second intensity distribution of said beam about said radiation axis, with a predetermined rate of rotation such that said parameter variation distribution of said workpiece increases in uniformity.

2. An improved method of altering a workpiece comprising the steps of:
   (a) generating a beam of radiation having a first propagation direction, a predetermined beam area in a plane perpendicular to said propagation direction and a predetermined amount of power distributed in a first intensity distribution in said predetermined beam area;
   (b) directing substantially all of said predetermined amount of power in said beam into said workpiece along a radiation path having a radiation axis, said amount of power being distributed in a plane perpendicular to said radiation axis with a second intensity distribution dependent on said first intensity distribution, whereby said radiation alters a parameter of said workpiece by a variable amount having a parameter variation distribution dependent on said second intensity distribution, wherein the improvement comprises:
   (c) rotating said second intensity distribution of said beam about a rotation axis parallel to said radiation axis and in which said amount of power in said beam is displaced from said radiation axis and directed along a second radiation axis, displaced from and substantially parallel to said radiation axis, whereby said rotation axis is offset from said second radiation axis by a predetermined amount.

3. An apparatus for manipulating a beam of radiation having an intensity distribution comprising:
   a housing having an axis of rotation,
   a first mirror disposed along said axis of rotation for deflecting radiation away from said axis of rotation,
   a second mirror disposed parallel to and offset from said axis of rotation for reflecting said deflected radiation back toward said axis of rotation and
   a third mirror disposed to intercept said radiation reflected by said second mirror and oriented to reflect said radiation along an exit axis parallel to said rotation axis and
   means for rotating said housing, whereby said beam of radiation is rotated about said axis of rotation, characterized in that:
   said third mirror is disposed so that said exit axis is offset from said axis of rotation by a predetermined amount, whereby said intensity distribution is moved about said axis of rotation along an epicycloidal path.

* * * * *

UNITED STATES PATENT AND TRADEMARK OFFICE
CERTIFICATE OF CORRECTION

PATENT NO. : 4,370,540

DATED : January 25, 1983

INVENTOR(S) : Jack W. Davis et al

It is certified that error appears in the above-identified patent and that said Letters Patent is hereby corrected as shown below:

```
Column 1, line 48, "set al." should read -- et al --
Column 2, line 32, after "exemplary" insert -- embodiment --
Column 6, line 37, "distributin" should read -- distribution --
Column 7, line 20, after "in" insert -- a --
Column 8, line  5, "into" should read -- onto --
```

Signed and Sealed this

Twenty-second Day of November 1983

[SEAL]

Attest:

GERALD J. MOSSINGHOFF

Attesting Officer

Commissioner of Patents and Trademarks